J. D. BINGHAM.
STEM FOR IMPACT PULVERIZERS.
APPLICATION FILED NOV. 17, 1917.
1,282,671.
Patented Oct. 22, 1918.
2 SHEETS—SHEET 2.
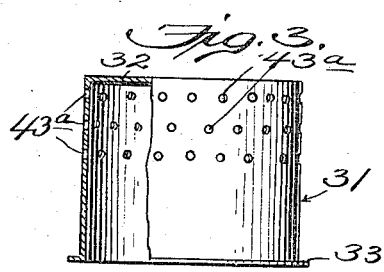
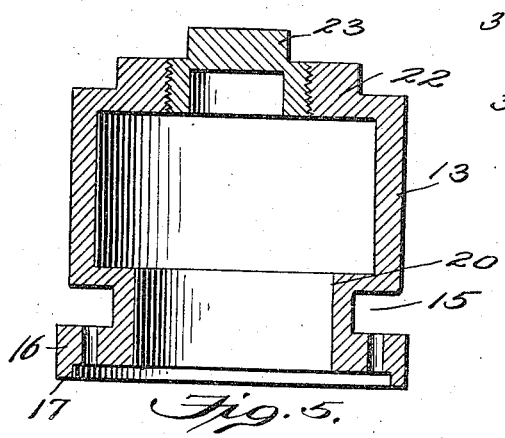
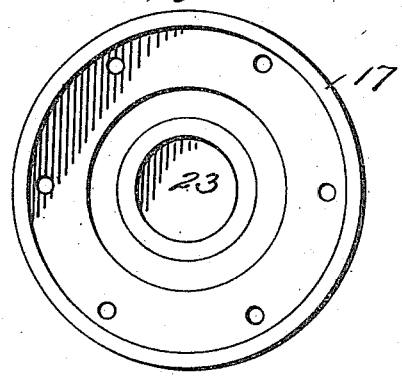
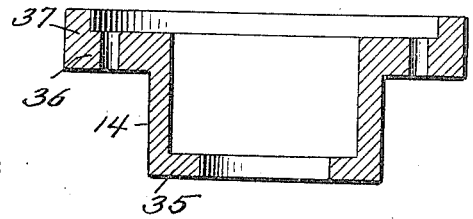
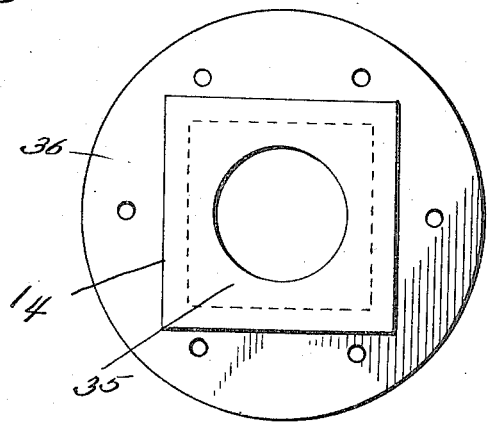
Witness
Chas. S. Hyer
Inventor
John D. Bingham
By
Attorney

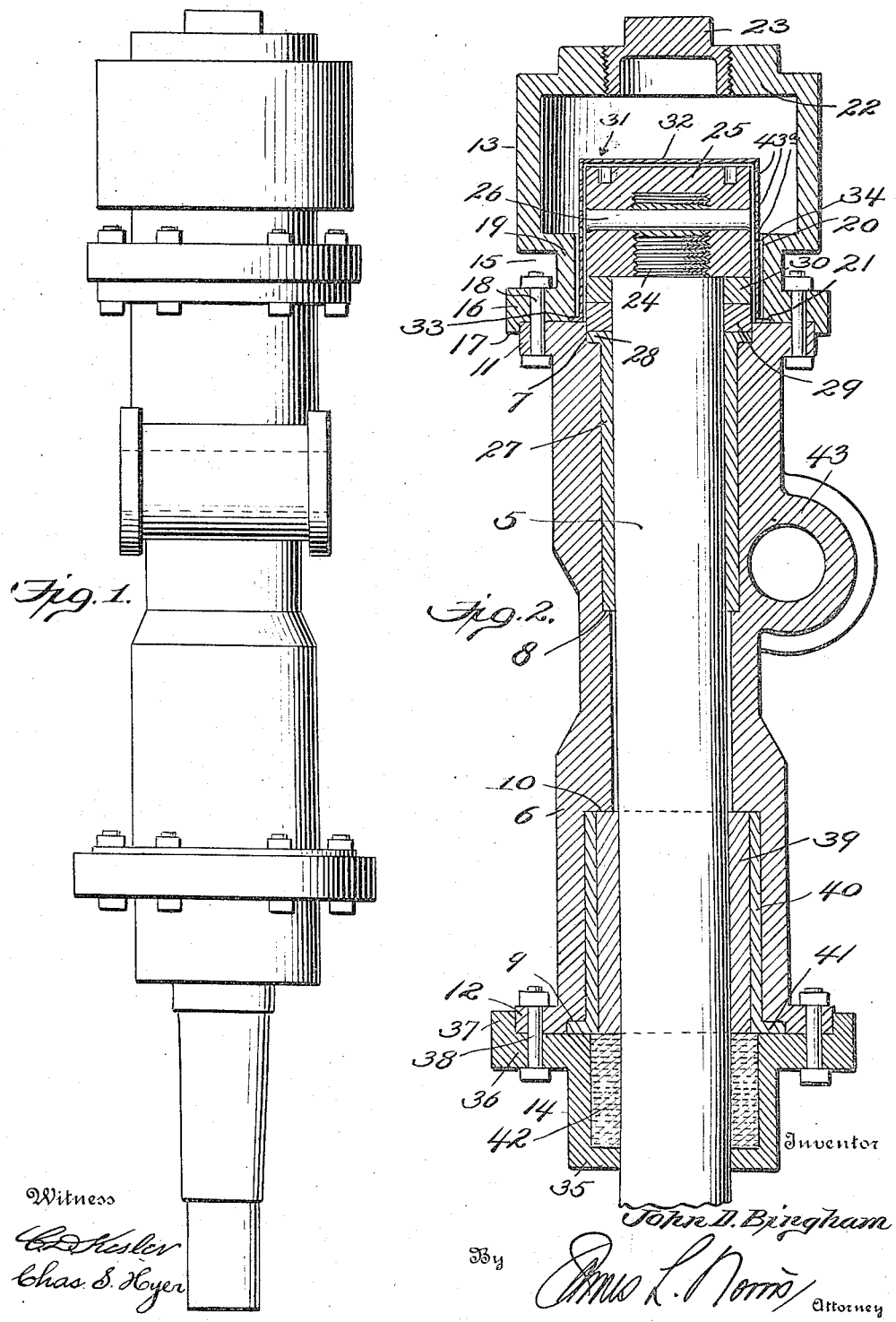

UNITED STATES PATENT OFFICE.

JOHN D. BINGHAM, OF ALPENA, MICHIGAN, ASSIGNOR OF ONE-HALF TO ARTHUR C. DANE, OF ALPENA, MICHIGAN.

STEM FOR IMPACT-PULVERIZERS.

1,282,671.     Specification of Letters Patent.     Patented Oct. 22, 1918.

Application filed November 17, 1917. Serial No. 202,678.

*To all whom it may concern:*

Be it known that I, JOHN D. BINGHAM, a citizen of the United States, residing at Alpena, in the county of Alpena and State of Michigan, have invented new and useful Improvements in Stems for Impact-Pulverizers, of which the following is a specification.

This invention relates to stems for impact pulverizers, and particularly to a lubricant or grease retarder and advantageous thrust bearing means for the stem, and one object of the invention is to locate a grease retarder in the grease cap at the top of the stem to regulate the amount of grease that is fed or supplied to the shaft and bearings and provide for a thorough and effective lubrication without leakage or loss of the lubricant. A further object of the invention is to completely house the shaft and coöperative bearings and structural features to protect and render the same dust-proof, and also to construct the several parts in such manner that they may be readily assembled in coöperative relation.

With these and other objects and advantages in view, the invention consists in the construction and arrangement of the several parts which will be more fully hereinafter described and claimed.

In the drawings:—

Figure 1 is a side elevation of a stem embodying the features of the invention.

Fig. 2 is a vertical section of the stem.

Fig. 3 is a detail elevation of the improved grease retarder shown broken away and partially in section.

Fig. 4 is a detail sectional view of the grease or lubricant supplying cap.

Fig. 5 is a detail bottom plan view of the cap.

Fig. 6 is a detail transverse section of a stuffing-box applied to the lower portion of the stem.

Fig. 7 is a detail bottom plan view of the stuffing-box shown by Fig. 6.

The numeral 5 designates the shaft mounted centrally within a main housing element 6 interiorly shaped or bored to form an upper annular recess 7 and an intermediate shoulder 8, and a lower annular recess 9 and shoulder 10 between the latter recess and the said shoulder 8. The upper and lower ends of the housing element 6 are also formed with flanges 11 and 12 for respective attachment thereto of a grease cap 13 and a stuffing-box 14. The grease cap 13 has a recess 15 at its lower end with an offset flange 16 to engage the flange 11 and a depending guard flange 17 continuous with the flange 16 to overlap the joint between the flanges 11 and 16 to form a tight dust-proof joint, the two flanges 11 and 16 being connected by suitable bolts and nuts 18. The recess 15 of the grease cap 13 is formed by projecting a part of the side wall of the cap inwardly, as at 19, to provide for a somewhat reduced lower opening 20 through the said cap, the lower portion of the wall of this opening being intersected by an annular recess 21 for a purpose which will be presently explained. The top 22 of the grease cap has a central screw-threaded plug 23 for the purpose of supplying the cap with grease or lubricant. The shaft 5 projects at its upper extremity above the flange 11 of the housing element 6 centrally into the opening 20 at the lower portion of the grease cap 13 and terminates in a reduced screw-threaded end 24 to receive a cap nut 25 secured against movement after application by a transversely extending locking pin 26 inserted therethrough and the screw-threaded end 24 of the shaft 5. A bronze bushing 27 surrounds the upper portion of the shaft 5 and has its lower end bearing against the shoulder 8 and its upper end formed with an outwardly projecting flange 28 seated in the recess 7, and on this upper flanged end of the bushing 27 a steel collar 29 is mounted and between this collar and the portion of the cap nut 25 projecting outwardly beyond the shaft 5 is a bushing ring 30 preferably formed of bronze. By this means an effective thrust bearing is provided which has a diameter slightly less than the diameter of the opening 20 at the lower portion of the grease cap 13, and over the upper portion of this bearing a grease retarder 31 is loosely fitted and practically incloses the nut 25, bronze bushing ring 30, and a portion of the steel collar 29 without touching these parts. This grease retarder, as shown in detail by Fig. 3, preferably consists of a thin sheet metal cap-like device of cylindrical form having a closed top 32 and a fully open bottom surrounded by an outwardly projecting flange 33 by which it is secured in the recess 21. When the retarder is mounted in place, as shown by Fig. 2, an annular space 34 is formed between the same and the wall of the opening 20 and the nut 25, ring 30, and a portion of the steel collar 29.

The shaft 5 projects through the central depending member or box inclosure 35 of the stuffing-box 14, the latter having an upper flange 36 with a right angular guard flange 37 to fit snugly against and close over the joints between the flanges 36 and 12, suitable bolts and nuts 38 being used to connect the said flanges 36 and 12 and thereby form a tight, non-leakable, and dust-proof joint at this point. The thrust bearing for the shaft 5 also includes an elongated collar 39 secured to said shaft and bearing against the shoulder 10, a suitable bronze or other bushing 40 being interposed between the collar and the adjacent portion of the wall of the housing element 6 and terminating in a lower outwardly projecting flange 41 which is seated in the recess 9. Within the box inclosure 35 of the stuffing-box around the portion of the shaft 5 extending therethrough a suitable packing 42 is introduced, said packing being of any material suitable for the purpose.

The housing element 6 is also provided with an apertured attaching member 43 for engagement therewith of the operating mechanism. It will be understood that the shaft 5 projects below the stuffing-box 14 any suitable distance and will have applied thereto any suitable form of impact means that may be used in connection with pulverizing machines.

Ordinarily, four stems with grinding rolls keyed to the lower ends of the shafts are held in vertical position in the pulverizer or mill by a spider or holder which permits these stems to be swung out when the mill is running. When the mill is in operation the spider revolves in a horizontal plane and the rolls on the stems are thrown by centrifugal force against the horizontal grinding tire. This action causes each shaft to turn rapidly in the housing element 6 which is usually of cast iron and forms part of the stem. When the material being pulverized is reduced to a certain desired fineness, it is lifted from the grinding chamber by means of an air separator. The stems do all their work in a chamber filled with dust, and, in order to withstand the severe duty, they must be well lubricated. In the improved stem, as hereinbefore disclosed, the grease is packed in the grease cap around the retarder 31 and when the shaft revolves the grease is pulled by centrifugal force through a plurality of openings 43ª formed in the retarder at different elevations and as may be desired and works its way down through the housing of the stem. The number of openings or perforations 43ª in the retarder varies with the quality of grease used. The improved retarder not only conserves the grease to a great extent but also insures a constant and uniform flow thereof onto the moving parts. The location of the thrust bearing at the top of the shaft where it is always immersed in the lubricant used in a readily accessible manner is also advantageous in devices of this character, and coacting with this thrust bearing is the auxiliary thrust retarding means comprising the collar 39 on the shaft 5 and which operates within the bushing 40 and against the shoulder 10. The grease retarder regulates the amount of grease that is admitted to the shaft or bearings and prevents unnecessary flooding of the latter and consequent waste but at the same time provides for a thorough lubrication of the shaft and its bearing means.

What is claimed as new is:

1. In a stem of the class specified, a shaft, a grease cap mounted over the upper extremity of the shaft, and a grease retarder disposed within the cap and having apertures therein and also fitted over and inclosing the upper end and a portion of the body of the shaft and projecting upwardly into and exposed within the grease cap.

2. In a stem of the class specified, a housing, a shaft mounted within the housing, a grease cap secured to the upper end of the housing over the upper extremity of the shaft, a thrust bearing coöperating with the upper extremity of the shaft and projecting into the grease cap, and a grease retarder fitted over the thrust bearing and exposed within the grease cap, said retarder having openings therein whereby the grease may be pulled inwardly to the shaft and the bearings of the latter in an economical application thereof.

3. In a stem of the class specified, a housing element, a shaft rotatably mounted in said housing element, a grease cap secured to the upper end of the housing element over the upper extremity of the shaft, a stuffing-box secured to the lower end of the housing element and through which the shaft projects, a thrust bearing at the upper end of the shaft and projecting into the grease cap, and a collar secured on the shaft adjacent to the stuffing-box and having terminal bearing against a portion of the interior of the housing element.

4. In a stem of the class specified, a housing element, a shaft rotatably mounted in said housing element, a grease cap secured to the upper end of the housing element over the upper extremity of the shaft, a stuffing-box secured to the lower end of the housing element and through which the shaft projects, a thrust bearing at the upper end of the shaft and projecting into the grease cap, a collar secured on the shaft adjacent to the stuffing-box and having terminal bearing against a portion of the interior of the housing element, and an apertured grease retarder fitted over the upper thrust bearing and exposed within the grease cap.

5. A stem for an impact pulverizer comprising a shaft, a grease cap applied over the upper extremity of the shaft, and a grease retarder of cup form also applied over the upper end and a portion of the body of the shaft within the cap and having a closed top, apertured side, and fully open bottom, the apertured side terminating in a lower outwardly extending securing flange engaged by a portion of the grease cap.

6. A lubricant feed retarding means for application to one extremity of a shaft of an impact pulverizer stem consisting of a thin metal cup-shaped body having an imperforate top, fully open bottom, and an apertured side to extend over a portion of the body of the shaft, the retarding means also being provided with an outwardly projecting flange for holding the same in place.

In testimony whereof I have hereunto set my hand in presence of two subscribing witnesses.

JOHN D. BINGHAM.

Witnesses:
W. E. HAGEN,
C. D. McLEOD.

Copies of this patent may be obtained for five cents each, by addressing the "Commissioner of Patents, Washington, D. C."